Patented Nov. 16, 1943

2,334,210

UNITED STATES PATENT OFFICE 2,334,210

MANGANESE ELECTROLYTE PURIFICATION

Karl M. Leute, Minneapolis, Minn., assignor to Electro Manganese Corporation, Minneapolis, Minn., a corporation of Delaware No Drawing. Application March 22, 1941, Serial No. 384,701

8 Claims. (Cl. 204—105)

In the electrowinning of manganese the electrolyte is divided into two portions in the electrolytic cell, catholyte and anolyte, the catholyte liquid and anolyte liquid containing different proportions of manganese in the form of a soluble salt, usually manganese sulphate, together with an ammonium salt, usually ammonium sulphate. Owing to electrolytic changes the pH of the catholyte is substantially greater than that of the anolyte and the latter contains substantial proportions of acid, usually sulphuric acid. The commercial cycle of operations comprises the deposition of manganese on the cathode in the catholyte chamber from the catholyte liquid, the transfer of liquid from the catholyte chamber to the anolyte chamber, the withdrawal of anolyte liquid from the anolyte chamber and its use to extract fresh ore, the purification of the extract to eliminate, in so far as possible, impurities and metallic elements other than manganese, and the use of the purified extract as fresh catholyte feed liquid. The electrolyte is therefore a reservoir to which is added soluble extract from the ore and from which metallic manganese is deposited. Any impurities in the extract, unless satisfactorily removed therefrom, either cumulatively increase in the electrolyte or are deposited, together with manganese, on the cathode as contaminations of the cathode deposit.

The success of the electrolytic process for the electrowinning of manganese requires the use of catholyte liquid having a high degree of purity because the deposit must be particularly pure and any impurities in the catholyte contaminate the deposit and interfere with the successful deposition of manganese. The principal impurities which it is necessary to remove from the extract obtained by treating fresh ore with the anolyte liquid are iron, nickel and cobalt. The iron may be preferentially removed by oxidizing the extract, as for example with air or other suitable oxidizing agent, at a suitable pH range which may be about 5.5 to 6.5, preferably about 5.5 to 6.0. The maximum pH of the extract, consistent with extraction efficiency, prior to the precipitation of iron is about 5 and may be 2 to 5, depending upon the nature and condition of the ore and the method employed in extracting the ore with the anolyte liquid. The efficiency of manganese extraction decreases with increase of pH. It is therefore desirable that the initial pH of the anolyte be as low as possible and the final pH of the extract, prior to iron precipitation, is, in an efficient process, lower than that necessary for adequate iron precipitation. Therefore, in order to precipitate the iron it is necessary to increase the pH of the extract. There are few agents which can be commercially employed for this purpose owing to economical criteria, the principal ones being calcium hydroxide or lime, ammonia and sodium hydroxide or sodium carbonate. None of these have been entirely satisfactory for various reasons. If lime is used calcium sulphate is precipitated. This results in a loss of sulphate, and in addition the precipitation and filtration of calcium sulphate carries down substantial proportions of manganese which can be recovered only with difficulty and uneconomically. If gaseous or concentrated ammonia solutions are employed manganese is precipitated locally, thus resulting in an uneconomical loss of manganese. If dilute ammonia solutions are employed the undesirable manganese precipitation is minimized but the water added in the form of the dilute ammonia solution reduces the effective manganese concentration of the liquor. This effect may be so great as to bring the concentration of manganese to a point lower than that desired for use of the liquid as catholyte in the cell, since efficient manganese deposition and adequate control of the electrolytic process requires that the catholyte shall have a concentration of manganese within certain fairly definite limits, as for example 25 to 50 grams of manganese per litre, in the form of manganese sulphate, for example. If sodium hydroxide or sodium carbonate be added there is the difficulty either of local precipitation of manganese depending upon the concentration of the sodium salts, or if these be added in very dilute form, the undesirable dilution by water with the added disadvantages that in a cyclic process sodium ion concentration builds up with successive treatments, and sooner or later complex sulphates of sodium, ammonium and manganese having low solubilities within certain temperature ranges are formed and precipitate out at various points of the system. This causes loss of manganese metal as well as mechanical and electrical disturbances. If specially conditioned ore be used as a neutralizing agent or a means of changing the pH, the rate of reaction is slow and the extraction efficiency, in terms of manganese, from the ore is low at that point and impurities from the ore are introduced into the system necessitating further purification to remove these.

Following precipitation of iron and filtration, the preferential removal of cobalt and nickel as insoluble sulfides is the next step for which purpose the pH of the liquid must again be adjusted, as for example a range of about 7.2 to 7.5. Here again a problem arises as to a satisfactory agent for effecting pH adjustment and the difficulties which have been mentioned above regarding the use of the economically available alkalizing reagents such as lime, ammonia and sodium hydroxide or carbonate (including loss of manganese in non-recoverable form in the precipitate produced) apply also to the precipitation of nickel and cobalt.

It is an object of the present invention to effectively purify catholyte liquid obtained by the extraction of manganese ore with an acid solution, particularly anolyte liquid.

It is a further object to effectively and satisfactorily separate manganese from iron, nickel and cobalt.

It is a further object of the present invention to adjust the pH in the precipitation of iron, nickel and cobalt or other impurities to avoid loss of manganese, loss of sulphate and the introduction of undesirable impurities and disturbances of the mechanical and electrical conditions in the cell.

It has been discovered that these and other objects can be attained by the use of catholyte liquid as the agent for effecting the necessary pH adjustment for the precipitation of iron (also arsenic and antimony), nickel and cobalt. As already stated, the catholyte liquid has a pH much higher than that of the anolyte liquid. The pH range of liquid in the catholyte chamber may be 7 to 9 and in a typical case may be about 7.2 to 8.5. By using liquid from the catholyte chamber the necessary pH adjustment can be attained without the formation of any precipitate requiring filtration and no loss of manganese is occasioned by being carried down. Thus the disadvantage of employing calcium hydroxide or lime is obviated. Furthermore, the danger of local precipitation of manganese such as would be occasioned by the use of gaseous ammonia or concentrated ammonia solutions is obviated, as well as the disadvantage of dilution which would be caused by the use of dilute ammonia solutions. In addition the catholyte liquid being in a high state of purity and being substantially free from metallic ions other than manganese and ammonium, does not introduce, cumulatively or otherwise, impurities of the type which would be introduced by the use of fixed alkalis such as sodium hydroxide, sodium carbonate and the like.

The principles of the invention will be set forth in the claims ultimately appended hereto, and the invention and said principles will be illustrated by a typical case which will be described as follows:

Anolyte liquid having a concentration of 3 to 5 grams per litre of manganese in the form of manganese sulphate, about 150 to 170 grams of ammonium sulphate per litre and a pH of about 1 to 2 is removed from the anolyte chamber of a cell for the electrowinning of manganese and is mixed in a suitable digester with conditioned manganese ore, as for example, manganese carbonate or reduced manganese oxide containing impurities, principally iron, arsenic antimony, nickel and cobalt. The pH of the anolyte liquid may be caused by sulphuric acid generated therein by electrolytic processes, and if desired additional sulphuric acid may be added in the digester, or prior thereto. When the equilibrium between the ore and the digester liquid is attained the pH of the digester liquid is about 2 to 5.

A proportion of catholyte liquid sufficient to raise the pH of the digester liquid to about 5.5 to 6 is then added and the iron is oxidized, preferably by blowing with air, although oxidizing agents in general which do not introduce undesirable impurities may be employed. Oxidation is continued until precipitation of iron is completed and at the same time arsenic and antimony are thrown down if present. Filtration is then employed in order to separate the precipitates and residual gangue. The filtrate which has a pH of about 5.5 to 6 is then ready for treatment to condition it for the precipitation of nickel and cobalt. For this purpose it is desirable to adjust the pH to about 7.2 to about 7.5 for complete precipitation, and here again sufficient liquid from the catholyte chamber is employed to effect this adjustment. An aqueous solution of ammonium sulphide having a concentration of, for example, about 25 percent may then be added to the filtrate in proportion sufficient to effect precipitation of nickel and cobalt. This proportion will vary with the nickel and cobalt content of the liquid treated and is employed in the proportion of about 5 percent in excess of the stoichiometrical amount needed. The filtrate is then ready for use in the catholyte chamber and has a composition in the typical case mentioned as follows:

Manganese per litre as manganese sulphate__grams 25 to 50
Ammonium sulphate__grams per litre__ 150 to 170
pH _____ 7.2 to 7.5

This catholyte liquid is then sent to the catholyte chamber, manganese is precipitated therefrom on the cathode, catholyte liquid is transferred to the anolyte chamber by positive transfer as well as division in the diaphragm, thus completing the cycle. Instead of ammonium sulfide, soluble sulfides in general may be used but ammonium sulfide is preferred because it does not introduce impurities into the solution.

In some cases it may be advantageous to add the necessary proportion of soluble sulfide (to precipitate nickel and cobalt) after the separation of the iron precipitate (and prior to the addition of catholyte) and then add catholyte to bring the pH to about 7.2 to 7.5 because the soluble sulfide, e. g. ammonium sulfide contributes alkalinity and a more exact control of pH may be obtained by this procedure together with economy in the use of catholyte.

In accordance with this invention, the extract from the extraction of the ore with anolyte is adjusted to that range of pH adapted for the preferential precipitation of iron in the presence of manganese, by oxidation to the ferric condition. The pH range best adapted for this purpose is herein set forth as 5.5 to 6.5, preferably 5.5 to 6.0, but the invention is not limited to this precise range. The range of pH at which iron preferentially precipitates in the presence of manganese, when oxidized to the ferric condition, is known, per se, and this invention is directed to the use of catholyte in attaining this range and the advantages flowing from said use. By the same token, the range of pH at which nickel and cobalt, separately or together, may be precipitated by soluble sulfides or other precipitants, selectively or preferentially in relation to manganese, is known, per se, and this invention is directed to the use of catholyte in attaining this pH range. For example, nickel and cobalt may be selectively precipitated by sulfide ions (pH about 7.2 to 7.6), nickel alone by means of dimethylglyoxime (pH about 6.9 to 7.4), cobalt alone by means of nitroso betanaphthol (pH about 6.9 to 7.4) cobalt and nickel together by means of ferro- or ferricyanide ions (pH about 6.7 to 7.4). Therefore the invention includes the use of precipitants, generally, for cobalt and nickel to cause the selective precipitation of these metals at ranges of pH adapted to cause this precipitation, where catholyte is the reagent used to adjust the liquid to the desired pH range.

In summary, therefore, the invention applies to the purification of the acid extract obtained by extracting manganese ore with acid anolyte and comprises first precipitating iron by oxidation after precipitating nickel and cobalt and, in each instance, adjusting the pH of the liquid in which precipitation occurs to the range adapted for said precipitation by adding catholyte to said liquid.

I claim:

1. In a cyclic process for the electrowinning of manganese comprising the use of an electrolytic cell in which the electrolyte consisting essentially of manganous sulfate and ammonium sulfate, is divided into catholyte and anolyte, extraction of manganese ore with anolyte liquid, purification of said extract to remove impurities including iron, nickel and cobalt, and addition of said purified extract to the catholyte; the steps which comprise extracting ore with anolyte liquid to obtain an extract having a pH of about 2 to 5; then treating said extract with catholyte withdrawn from a cathode chamber until the extract has a pH of about 5.5 to 6.0; and oxidizing said treated extract to precipitate iron.

2. In a cyclic process for the electrowinning of manganese comprising the use of an electrolytic cell in which the electrolyte consisting essentially of manganous sulfate and ammonium sulfate, is divided into catholyte and anolyte, extraction of manganese ore with anolyte liquid, purification of said extract to remove impurities including iron, nickel and cobalt, and addition of said purified extract to the catholyte; the steps which comprise extracting ore with anolyte liquid to obtain an extract having a pH of about 2 to 5; then treating said extract with catholyte withdrawn from a catholyte chamber until the extract has a pH of about 5.5 to 6.0; and blowing said treated extract with air to precipitate iron.

3. In a cyclic process for the electrowinning of manganese comprising the use of an electrolytic cell in which the electrolyte consisting essentially of manganous sulfate and ammonium sulfate, is divided into catholyte and anolyte, extraction of manganese ore with anolyte liquid, purification of said extract to remove impurities including iron, nickel and cobalt, and addition of said purified extract to the catholyte; the steps of adding catholyte withdrawn from a cathode chamber to the acid extract from the ore to bring the pH within the range at which iron precipitates when oxidized to the ferric condition; treating said extract, with catholyte has been added, with an oxidizing agent to oxidize the iron to the ferric condition and to precipitate the iron; separating from a cathode chamber to the said mother-liquid to adjust the pH of said precipitation of nickel and cobalt; adding a nickel and a cobalt precipitant; separating the nickel and cobalt precipitate and adding the mother-liquid from said separation to the body of catholyte in the catholyte chamber.

4. In a cyclic process comprising the electrowinning of manganese comprising the electrolytic cell in which the electrolyte consisting essentially of manganous sulfate and ammonium sulfate, is divided into catholyte and anolyte, extraction of manganese ore with anolyte liquid, purification of said extract to remove impurities including iron, nickel and cobalt, and addition of the step of said extract to the catholyte; the steps comprise fying said extract by oxidation separating the iron condition and thereafter separating from the liquid and separating nickel and cobalt and and, cipitate from the liquid of the liquid adjusting the pH of the range tation occurs to the to s precipitation by adding to withdrawn from a cathode 6. In a cyclic process for manganese comprising the electr cell in which the electr ganous sulfate and an into catholyte and ano ganese ore with anol said extract to remov nickel and cobalt a extract to the cath prise extracting o tain an extract s then treating a drawn from a p tract has a extr treated extrac the precipit catholyte amm ove liquid, extraction of cobalt and addition of impurities including to the catholyte; the steps which extracting ore with anolyte liquid to then treating the said extract with catholyte withdrawn from a cathode chamber until the extract has a pH of about 5.5 to 6; blowing said treated extract with air to precipitate iron, separating the precipitate from the mother liquor, adding the catholyte withdrawn from a cathode chamber and ammonium sulfide, in the order named, to the mother liquor to adjust the pH of said liquor to within the range of about 7.2 to about 7.6 suitable for precipitation of cobalt and nickel with ammonium sulfide, precipitating cobalt and nickel as sulfides, separating the precipitate from the mother liquid and adding said liquid to the catholyte in the catholyte chamber.

8. In a cyclic process for the electrowinning of manganese involving the use of an electrolytic cell in which the electrolyte comprising manganese sulfate and ammonium sulfate is divided into catholyte and anolyte, and in which process manganese ore is extracted with anolyte to produce an extract from which gangue is separated, and in which iron is precipitated at a pH of about 5.5 to 6.5 and the mother liquor separated from the iron precipitate, the improvement which comprises adding catholyte withdrawn from a cathode chamber and ammonium sulfide to said mother liquor to adjust the pH of said liquor to within the range of about 7.2 to 7.6 and to precipitate cobalt and nickel as sulfides, precipitating said sulfides and separating them from the liquid to produce purified catholyte.

KARL M. LEUTE.